Dec. 6, 1966   G. A. PETTIT   3,290,485
TEMPERATURE CONTROLLING DEVICE
Filed Jan. 6, 1964   2 Sheets-Sheet 1
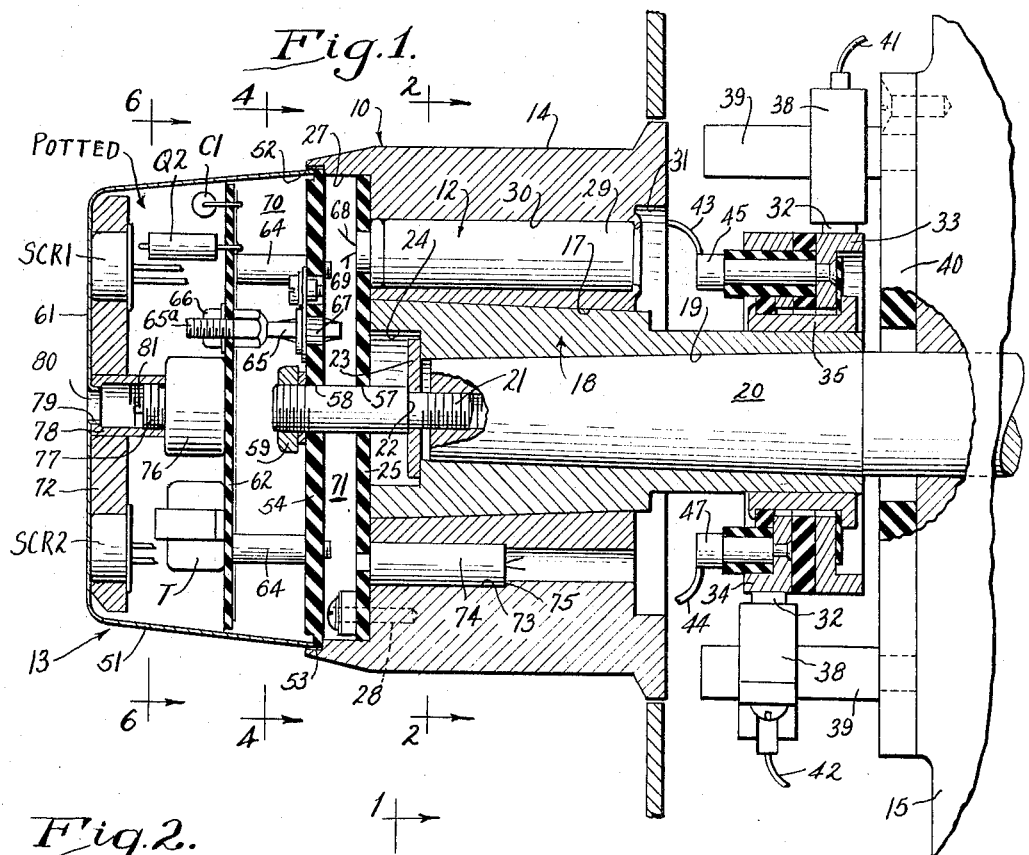
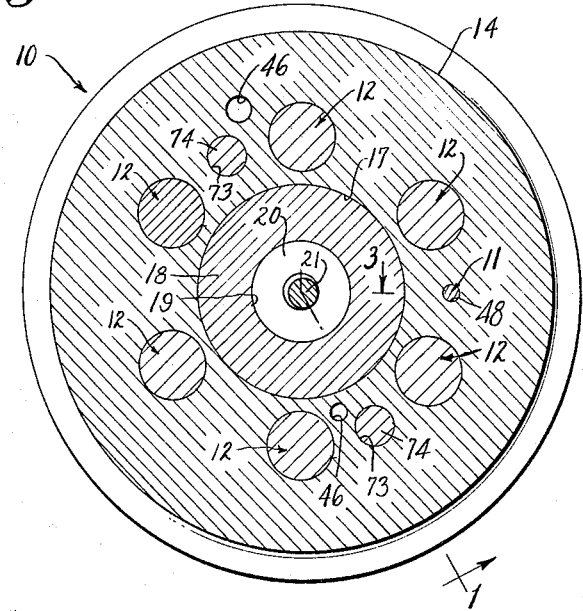
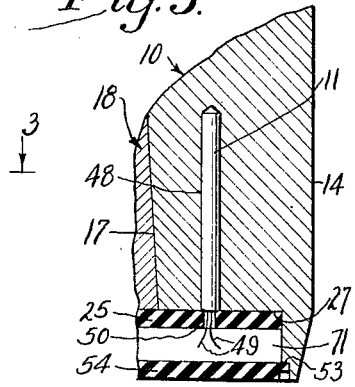
INVENTOR.
Glenn A. Pettit
BY Wolfe, Hubbard,
Voit & Osann
ATTORNEYS

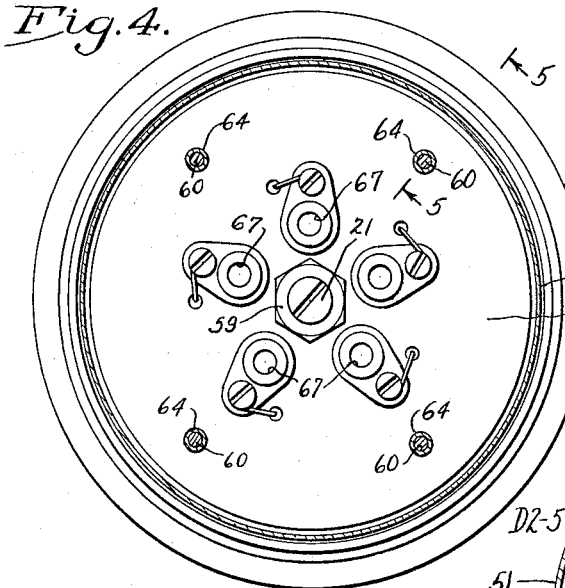
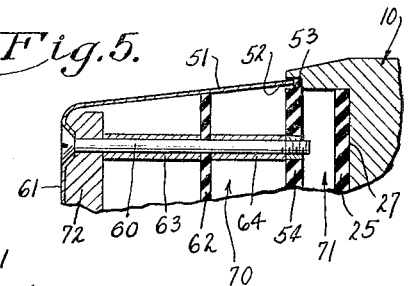
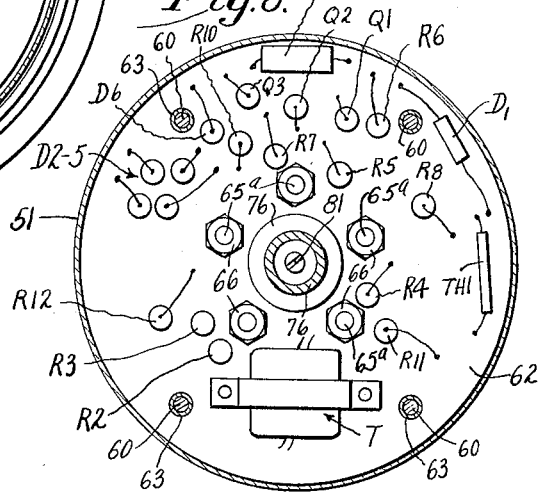
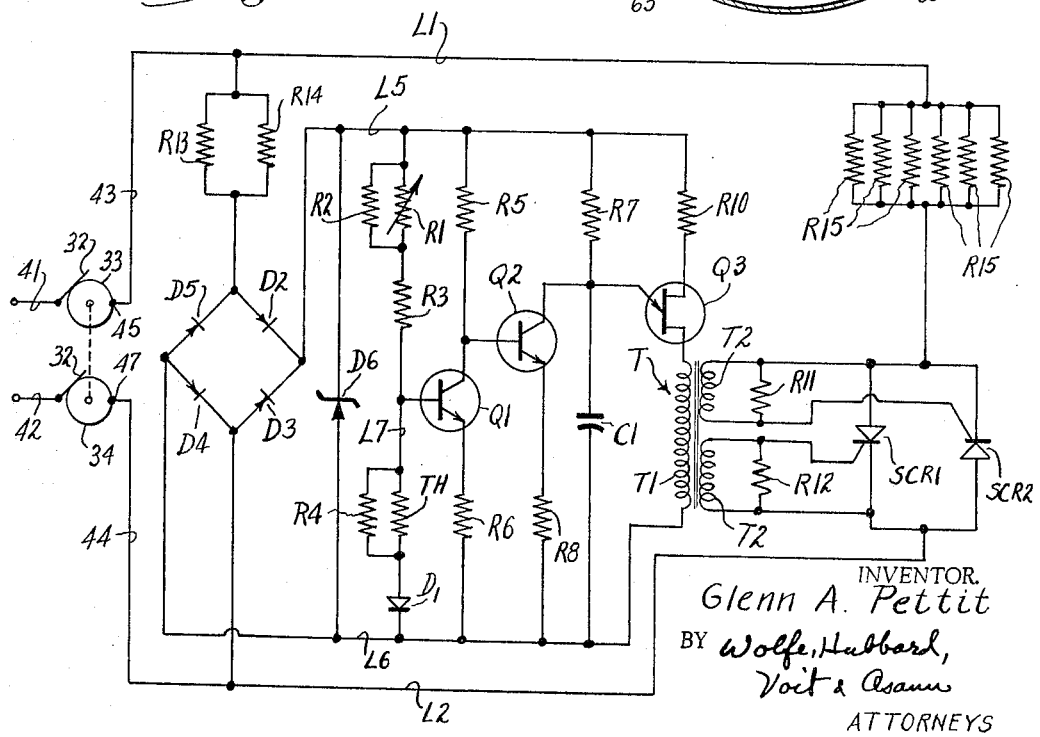
Glenn A. Pettit
INVENTOR.
BY Wolfe, Hubbard, Voit & Osann
ATTORNEYS United States Patent Office 3,290,485
Patented Dec. 6, 1966

3,290,485
TEMPERATURE CONTROLLING DEVICE
Glenn A. Pettit, Rockford, Ill., assignor to Barber-Colman Company, Rockford, Ill., a corporation of Illinois
Filed Jan. 6, 1964, Ser. No. 335,851
16 Claims. (Cl. 219—470)

The present invention relates in general to devices for heating strip material such as filaments of synthetic thermoplastic yarn which are heated to their softening temperature preparatory to twisting or stretching the yarn to realine the molecules thereof. The invention pertains, more particularly, to temperature controlling devices of the type in which the heated contact member rotates in the direction of movement of the material to be heated at the line of contact and at a peripheral speed equal to the linear speed of the material so as to eliminate frictional drag on the material during heating.

The general object of the present invention is to increase the accuracy with which the temperature of the heated member may be controlled in a device of the foregoing character thereby to obtain more uniform and carefully controlled heating than has been possible with prior rotary heating devices in commercial use.

A more detailed object is to eliminate inaccuracies and time lags in the controlled temperature due to air gaps between the contact surface and the temperature sensing element.

Another object is to utilize the sensed temperature signals more effectively than has been possible heretofore by mounting an automatic temperature controller responsive to the signals directly on the rotating member.

A further object is to minimize the heating of the components of the temperature controller by the heaters despite the close proximity of the heated member and the heaters.

Another object is to isolate the hot-running components of the controller in a novel manner from the cool-running components thereof, and either rapidly dissipate the heat produced by such components or utilize the heat to assist in heating the contact member.

Other objects and advantages will become apparent from the following detailed description taken in connection with the accompanying drawings, in which FIGURE 1 is a fragmentary longitudinal cross-sectional view of an exemplary temperature controlling device embodying the novel features of the present invention, the view being taken substantially along the line 1—1 of FIG. 2.

FIG. 2 is a fragmentary cross-section taken along the line 2—2 of FIG. 1.

FIG. 3 is an enlarged fragmentary cross-section taken substantially along the line 3—3 of FIG. 2.

FIG. 4 is a fragmentary cross-sectional view taken along the line 4—4 of FIG. 1.

FIG. 5 is a fragmentary view similar to a portion of FIG. 1 with certain parts broken away and shown in section.

FIG. 6 is a fragmentary cross-section taken substantially along the line 6—6 of FIG. 1.

FIG. 7 is a schematic diagram of the electrical circuit for the device.

As shown in the drawings for purposes of illustration, the invention is embodied in a device for heating filaments of thermoplastic yarn such as nylon and polypropylene to the softening temperature of the yarn material preparatory to twisting or stretching. When the yarn is subsequently cooled the molecules of the material are permanently realined in new arrangement. For example, the yarn used for tire cord is stretched while heated to insure uniform tension in the final tire fabric, and so-called stretch yarn is given a permanent false twist and sometimes is reheated and stretched to enhance its texture.

In the past, yarn has been heated by drawing it through a heated tube or across other stationary heaters. This type of heating device has the disadvantage of imposing a frictional drag on the yarn when it is in the softened condition with resultant uncontrolled stretching, and sometimes breaking. To eliminate the drag, heated drums rotating at peripheral speds equal to the linear speed of the yarn have been used. The problems with these heating devices reside in lack of sensitivity of temperature measurement and inaccuracy of temperature control. While the desired constant drum temperature may differ widely for different materials and linear speeds of the yarn, typically between 50° C. and 250° C., the treatment of a particular yarn requires uniform heating to a selected temperature that is carefully controlled within close tolerances on the order of ±0.5° C.

In prior rotary yarn heating devices, the most acceptable practice has been to measure and indicate the drum temperature with a stationary probe disposed adjacent a rotating surface of the drum. The heaters have been adjusted manually by trial and error to obtain the desired surface temperature. Of course, the inaccuracies and delays resulting from the gap between the stationary temperature probe and the drum and from the approximate control of the heaters produce temperature variations well beyond the permissible tolerances.

The present invention contemplates the provision of a novel rotary temperature controlling device in which the temperature of the rotating contact member, herein a drum 10, is measured by a sensing element or probe 11 mounted on and rotating with the drum, and in which the energization of the heaters 12 is regulated precisely in response to sensed temperature variations by a controller 13 (FIG. 1) also mounted on and rotating with the drum, the controller being constructed and arranged in a novel manner to minimize the effects of the drum heat on the various components of the controller. With this arrangement, air gaps adversely affecting the sensitivity of the probe are eliminated and the relatively weak temperature signals produced by the probe are delivered directly to the controller for accurate and automatic temperature control and more uniform heating of the yarn than has been obtained heretofore.

As here illustrated, the drum 10 is formed with a cylindrical peripheral surface 14 for heating the yarn as the latter is drawn over the drum, and is journaled on a suitable support such as an upright frame member 15 (FIG. 1) for rotation about a horizontal axis in the direction of movement of the yarn at the line of contact. The center bore 17 of the drum tapers conically toward the right hand end as viewed in FIG. 1 and telescopes over the outer end portion of a correspondingly tapered tubular sleeve 18, the bore 19 of which tapers toward its outer end and telescopes over the conical end of a power-driven shaft 20 journaled on the frame member.

To wedge the sleeve 18 tightly on the shaft 20, a stud 21 (FIGS. 2 and 4) is threaded into the end of the shaft with a shoulder 22 intermediate the ends of the stud abutting against a washer 23 seated in a counterbore 24 in the outer end of the sleeve. When the shoulder is tightened against the washer, the latter wedges the bore wall of the sleeve against the shaft. A disc 25 seated in a counterbore 27 in the outer end of the drum 10 is fastened to the drum by a set of angularly spaced screws 28 and abuts against the outer end of the sleeve to prevent sliding of the drum inwardly along the sleeve, thereby to hold the drum in tight frictional engagement with the exterior of the sleeve. Thus, the drum is coupled frictionally to the shaft and is journaled thereby on the frame member 15.

At least one heater 12 is mounted on the drum to heat the surface 14 thereof as the drum rotates, and herein a plurality of heaters are spaced angularly around and embedded in the drum to produce substantially uniform heating of the entire drum periphery. Each of these heaters comprises an electrical resistor R15 (see FIG. 7) enclosed in a metal cartridge 29 (FIGS. 1 and 2) which telescopes with a slip fit into a longitudinal bore 30 extending through the drum from the counterbore 27 in the outer end to a similar counterbore 31 in the inner end. Metal of the drum is swaged from the inner ends of the bores to abut against the inner ends of the cartridges, and the outer ends of the bores are closed by the apertured disc 25 which thus retains the cartridge in the drum.

Operating current is delivered to the heaters 12 from a remote voltage source (not shown) through stationary brushes 32 (FIGS. 1 and 7) supported on the frame 15 and engaging two axially spaced slip rings 33 and 34 mounted for rotation with the drum 10 on a supporting sleeve 35 fast on the inner end portion 37 of the sleeve 18 adjacent the frame. Each brush is held in engagement with its respective slip ring by a holder 38 supported on a bar 39 projecting outwardly from a plate 40 fixed to the frame, and receives current through a wire 41, 42 connected to the voltage source. The slip rings are suitably insulated from the sleeve 35 and from each other and are connected to the controller and heaters 12 by wires 43 and 44 extending from terminals 45 and 47 on the rings through two longitudinal bores 46 in the drum.

As shown in FIGS. 2 and 3, the temperature probe 11 is fitted in a blind bore 48 in the drum 10 opening through the bottom of the counterbore 27. Herein, the probe is a thermistor TH (see FIG. 7) protected by a cylindrical aluminum case which telescopes snugly into the bore, and is connected to the controller 13 by two wires 49 passing through a hole 50 in the disc 25 alined with the outer end of the thermistor bore. While the probe could be located closely adjacent the drum surface 14, the drum preferably is composed of a metal of high thermal conductivity such as aluminum which makes it possible to obtain accurate indications of the surface temperature with the probe spaced from the surface. As is well known to those skilled in the art, the resistance of the thermistor varies in accordance with its temperature, and such variations are herein utilized as temperature-representative signals employed to control the heaters.

The controller for receiving the temperature signals and regulating the heaters 12 in accordance therewith is housed in a cup shaped metal casing or cover 51 coaxial with and projecting outwardly from the outer end of the drum 10 with the rim 52 of the cover fitted within a second, larger counterbore 53, the outside diameter of the rim being slightly less than the inside diameter of the counterbore and spaced radially inwardly therefrom. A second disc 54 spaced outwardly from the inner retaining disc 25 is fitted in the outer counterbore 53 and fastened to the drum by the stud 21 which projects through center holes 57 and 58 in the two discs with a nut 59 threaded onto its outer end portion and tightened against the outer disc to hold the latter securely in place. The cover is held on the drum by elongated screws 60 projecting inwardly through the wall forming the outer end 61 of the cover and threaded into the outer disc 54 as shown in FIGS. 1 and 5 to clamp the cover rim against the outer disc. The screws also project through a circular circuit board 62 which is positioned approximately midway between the ends of the cover by two spacers 63 and 64 telescoped onto each screw on opposite sides of the circuit board.

A printed control circuit and most of the control components are on the outer side of the board 62. To facilitate replacement and repair of the controller 13, the electrical connections between the controller and the drum 10 are effected by readily releasable connectors in the form of a set of angularly spaced plugs 65 (FIGS. 1 and 6) projecting inwardly from the inner side of the circuit board 62 and held on the board by nuts 66 on their threaded outer ends 65ᵃ. An equal number of alined sockets 67 (FIGS. 1 and 4) are mounted on the outer disc 54 in position to receive the plugs as the cover is fitted in place against the end of the drum. Wires 68 and 69 (FIG. 1) from the heaters 12 and the wires 49 from the probe 11 connect these elements to the sockets and thus through the plugs to the printed circuit shown generally in FIG. 6.

With the foregoing arrangement, the controller components in the outer end of the cover 51 are spaced a substantial distance from the heated drum 10 while at the same time being mounted directly on the drum for rotation therewith. In addition, the spaces 70 and 71 between the three axially spaced discs 25, 54 and 62 are dead air spaces spanned only by the various fasteners and the electrical leads, and thus form effective barriers against the conduction of heat from the drum to the controller 13. The spacing of the fasteners 60 from the drum and the stud 21 avoids the formation of a continuous heat conducting path through the fasteners from the drum to the controller, and the spacing of the cover rim from the wall of the counterbore 53 minimizes heating of the rim. The discs themselves are composed of suitable insulating material such as laminated glass fabric impregnated with silicone resin and the cover preferably is composed of black anodized aluminum for rapid dissipation of heat from the controller. As a result, the temperatures in the cover are held at a substantially lower level than the drum temperatures, thereby to prevent damage to or faulty operation of temperature sensitive control components such as transistors and controlled rectifiers. The controller also includes an adjustable temperature selector in the form of a potentiometer R1 (see FIG. 7) for selecting the operating temperature of the drum.

The illustrative control circuit for the heaters 12 is shown schematically in FIG. 7 and includes solid state components in the form of silicon semiconductors capable of withstanding the lower temperature levels within the cover 51. The heater resistors R15 are all connected in parallel and the current and power supplied thereto is regulated by oppositely poled silicon controlled rectifiers SCR1 and SCR2 in series with the heater resistors across lines L1 and L2. Alternating current is supplied to the final control circuit, and to the remaining portions of the controller by lines L1 and L2 which in turn are connected to the slip ring terminals 45 and 47 to receive power from the source. Herein, the circuit is designed for use with a 120 volt A.C. source.

The thermistor TH, having a large negative coefficient of resistance, is in a transistorized control circuit which varies the average current through the rectifiers SCR1 and SCR2 in accordance with the resistance of the thermistor and, therefore, regulates the heat produced by the heater resistors to keep the drum surface temperature at a desired, but adjustable value. As will be seen in FIG. 7, the control current is obtained from a full-wave bridge rectifier comprising four diodes D2–D5 and having its input terminals connected through parallel voltage-dropping resistors R13 and R14. These latter resistors reduce input voltage to the bridge and the unfiltered output voltage of the bridge appearing on lines L5 and L6 is thus a 120 c.p.s. pulsating voltage. Such voltage is regulated and clipped to an acceptable level for operation of the transistors, e.g., 20 volts amplitude, by a Zener diode D6 connected across the lines L5 and L6, so that the voltage between these lines has the form of flat topped, full-wave rectified pulses. This voltage will hereafter be called the supply voltage.

The supply voltage is divided in line L7 by a voltage divider made up of a potentiometer R1, in parallel with a resistor R2, a resistor R3, the thermistor TH in parallel with a resistor R4, and a diode D1. The setting of the potentiometer R1 establishes the control point temperature to be maintained, and the resistor R4 makes the resistance-temperature characteristic of the thermistor more linear. The forward resistance of the diode D1 varies with ambient temperature and compensates for the temperature of the controller. Thus, variations in either the thermistor resistance, due to changes in the sensed temperature of the drum, or variations in the potentiometer resistance due to the manual setting thereof, cause variations in the voltage drop V across the thermistor. That voltage drop is, therefore, a measure of the departure or error between the desired control point temperature and the actual drum temperature.

The voltage drop is impressed across the base-emitter circuit of an N-P-N transistor Q1 through a series-connected emitter resistor R6. The collector is connected to line L5 through a load resistor R5. To further amplify variations in the temperature error signal, a second N-P-N transistor Q2 is driven by the first. As here shown, the base of transistor Q2 is connected to the collector of transistor Q1, and its emitter is connected through a resistor R8 to the line L6.

The collector-emitter circuit of transistor Q2 is connected in parallel with a capacitor C1, the latter being in series with a resistor R7 between the lines L5, L6. During each pulse of the supply voltage, the capacitor C1 tends to charge by current flow through the resistor R7, but the rate or slope of the increase in voltage across the capacitor is determined by the conductivity of transistor Q2. This recurring, generally sawtooth voltage is applied to the emitter of a unijunction transistor Q3 which has its base circuit connected across the lines L5, L6 through the primary winding T1 of a transformer T. Each time the unijunction device Q3 fires, it not only passes a current pulse through the primary winding T1, but also substantially instantaneously discharges the capacitor C1. Such current pulses induce corresponding pulses in the secondary windings T2 which are connected with opposite polarity in the gate circuits of the oppositely poled rectifiers SCR1 and SCR2. When each of the latter fires in response to a pulse applied to its gate, it conducts for the remaining portion of the half wave supply voltage which makes its anode positive relative to its cathode.

It will be apparent, therefore, that during each pulse of the supply voltage appearing between lines L5, L6, the capacitor C1 will have the voltage thereacross increase substantially linearly, and at a slope which is greater or lesser when the conductivity of transistor Q2 is lesser or greater, respectively. Therefore, the time delay between the instant that each supply voltage pulse begins and the instant that the capacitor voltage reaches the critical firing potential of the unijunction device Q3 varies according to temperature sensed by the thermistor TH. This determines the firing angle of the controlled rectifiers SCR1, SCR2 and the average value of the current passed through the heaters R15. The capacitor C1 is always fully discharged during each voltage pulse, even though its rate of charging may be held so low that the controlled rectifiers pass almost no current, because the unijunction device Q3 is fired by a very low emitter voltage as its interbase voltage drops at the end of each supply voltage pulse.

With the foregoing in mind, the operation of the controller may now be summarized. Assume the system is in balance with the temperature of the transistor TH and the drum 10 stabilized at the desired yarn treating temperature, represented by the setting of the control point potentiometer R1. A certain voltage drop V (although, of course, a pulsating voltage) will exist across the thermistor TH, and will cause base emitter current to flow through the transistor Q1 so that the latter passes current pulses of a certain amplitude. This, in turn, causes the transistor Q2 to be conductive to a certain degree during each supply voltage pulse, and establishes a certain slope for the charging of capacitor C1. The unijunction device Q3 thus fires at a given phase angle on each supply voltage pulse, and triggers the rectifiers SCR1, 2 at the phase angle which produces an average current flow through the heater resistors R15 necessary to maintain the drum temperature constant despite heat losses.

If the drum temperature changes, however, the resistance of the thermistor TH varies correspondingly to change the rate at which the capacitor C1 charges, and thus the phase angle at which the unijunction device Q3 and the controlled rectifiers fire, thereby to vary the current in the heaters. If the drum temperature begins to fall, the thermistor resistance increases and the average heater current is increased, while a rise in drum temperature decreases the thermistor resistance to decrease the average heater current until the selected treating temprature is restored.

For example, a decrease in the drum temperature, and the corresponding increase in the thermistor resistance, cause the voltage drop V to increase. This, in turn, increases the control current flowing through the base-emitter circuit of transistor Q1, and thus increases the current in the collector-emitter circuit of the latter. Accordingly, the potential (although pulsating) at the collector of the transistor Q1 decreases and the control current through the base-emitter circuit of transistor Q2 is correspondingly reduced. The collector-emitter current of the transistor Q2 decreases so that the capacitor C1 charges at a greater rate during each supply voltage pulse. Since the capacitor voltage reaches the critical firing potential of the unijunction device Q3 earlier, the firing phase angle of the rectifiers SCR1 and SCR2 is decreased. That is, if the unijunction originally was firing at a phase angle of 25 degrees on each half wave or pulse, it may now fire at a 20 degree phase angle. Thus, on alternate half cycles of the A.C. voltage across lines L1, L2, the respective rectifiers SCR1 and SCR2 will fire sooner than before so that the average current through the heater resistors R15, and the rate of heat generation thereby, is increased to counteract the assumed temperature decrease.

Of course, the current through the heater resistors is controlled in substantially the same way when the potentiometer R1 is adjusted to present a decreased resistance (calling for a higher control point temperature), and thereby increasing the thermistor voltage drop V. In this way, the operating temperature of the drum may be changed by changing the potentiometer set point.

It will be understood also that when the drum temperature for any reason increases above the desired set point temperature (or when the potentiometer R1 is readjusted to present an increased resistance calling for a lower set point), the voltage drop V decreases, the conduction of transistor Q1 decreases, the conduction of transistor Q2 increases, the rate of charging of capacitor C1 decreases, and the phase angle for firing of the unijunction device Q3 and the rectifiers SCR1 and SCR2 increases to reduce average current flow through the heaters R15.

During operation of the yarn heating device, a significant amount of heat is produced by the voltage dropping resistors R13 and R14 and the rectifiers SCR1 and SCR2, which may be termed "hot-running" components as compared to the other controller components which herein are referred to as "cold-running" components. To reduce the effect of this rectifier heat on the controller 13, the rectifiers, which also are relatively sensitive to heat, are mounted in a heat sink 72 and positioned against the outer end 61 of the cover. In this manner, the heating of the rectifiers by the drum 10 and the heating of the other circuit components by the rectifiers are minimized, and the heat generated by the rectifiers is dissipated through the cover at a rapid rate.

The voltage dropping resistors R13 and R14 not only are isolated from the heat-sensitive components of the controller 13 but also are placed so that their heat is employed for a useful purpose. In addition to being less expensive than a transformer which would perform the same voltage-reducing function, these resistors may be used actually to assist in the heating of the drum. For this purpose, the resistors R13 and R14 are contained in cartridges 74 inserted into two additional longitudinal bores 73 (FIGS. 1 and 2) of the drum. The cartridges are held in place between the retaining disc 25 and outwardly facing shoulders 75 formed by a reduction in the diameter of the bores at the inner ends of the cartridges.

In this instance, the potentiometer R1 is enclosed in a cylindrical case 76 supported on the outer side of the circuit board 62 and coaxial therewith, and an externally threaded bushing 77 fast on the outer end of the case extends outwardly toward the end wall 61 and is threaded into a sleeve 78. The outer end of the sleeve telescopes over an inwardly extending annular flange 79 around an access hole 80 in the end wall of the cover. The resistance selecting element of the potentiometer R1 is a shaft 81 having an outer end portion rotatable within the bushing 77, and also having a slotted outer end so that the operating temperature may be changed, without removing the cover 51 from the drum, with a screw driver or other appropriate adjusting tool inserted through the access opening. The space remaining between the circuit board 62 and the end 61 of the cover is potted with epoxy to hold the control unit together, prevent entry of moisture, and prevent motion of the controller components. It also assists in conducting heat from the components to the cover.

It will be seen from the drawings that all of the parts of the device have been arranged on the drum 10 to obtain both static and dynamic balance. The heaters 12, the plugs 65 and sockets 67, the voltage dropping resistors R13 and R14, and the various fasteners are equally spaced apart along concentric circles, and the individual components have been positioned to balance each other. Thus, the drum rotates smoothly with a minimum of vibration in service use.

From the foregoing, it should be apparent that the temperature probe 11 mounted on the drum 10 in contact with the metal thereof is capable of sensing temperature variations with greater accuracy than has been possible with prior devices of this general character, and that the mounting of the controller 13 on the drum makes it possible to utilize the temperature signals with optimum effectiveness and accuracy in regulating the drum heaters 12. Moreover, the controller is compactly constructed and mounted in a novel manner not only to space the heat-sensitive components as far as possible from the heated drum and provide a heat barrier between the components and the drum, but also to isolate the hot-running components from the cold-running components and make use of the heat generated by the voltage dropping resistors R13 and R14. The result is a small and reliable heating device capable of uniform temperature control within very close tolerances.

While the invention has been shown and described in its preferred embodiment as a device for heating thermoplastic yarn to its softening temperature, it will be apparent that a rotary temperature controller embodying the novel features of the present invention may be used in the heating of various types of material, and that various omissions, substitutions and changes in the form and details of the illustrated device and its operation may be made by those skilled in the art without departing from the spirit of the invention. It is intended, therefore, that the invention should be limited only as indicated by the scope of the following claims.

I claim as my invention:

1. A temperature controlling device including, in combination, a support, a drum rotatably mounted on said support and having a cylindrical peripheral surface for engaging the material to be heated, said drum also having a counterbore in one end and a plurality of equally spaced longitudinally extending bores opening into said counterbore, a plurality of electrical resistance heaters enclosed in cylindrical cartridges, one of said cartridges being fitted in each of said bores, a first insulating plate fitted against the bottom of said counterbore and secured to said drum to retain said cartridges in said bores, a second insulating plate spaced axially outwardly from said first plate and fastened to said drum to close said counterbore and cooperate with the first plate in defining an insulating air space, a temperature probe embedded in said drum and operable to produce an electrical signal varying in accordance with the temperature of said surface, means on said drum and said support for delivering current from a remote voltage source to said heaters and said probe while the drum is rotating, a cup-shaped casing coaxial with said drum and projecting outwardly from said one end, said casing having an open end fitted against said second plate, means releasably securing said casing to said drum for rotation therewith, an electrical controller responsive to said signal and operable to vary the energization of said heaters in accordance with variations in the signal, said controller being mounted in said casing and including a circuit board supported on the casing adjacent said second plate, and alined plug-and-socket type connectors on said board and said second plate for connecting said controller to said heaters, said probe, and said remote source.

2. A temperature controlling device including, in combination, a drum adapted to be supported for rotation about a predetermined axis and having a cylindrical peripheral surface for engaging the material to be heated, said drum having a plurality of angularly spaced longitudinally extending bores spaced below said surface and opening through one end of the drum, a plurality of electrical heaters enclosed in cartridges, one of said cartridges being fitted in each of said bores, a temperature sensing element embedded in said drum below said surface and operable to produce a signal varying in accordance with variations in the temperature of said surface, a first plate composed of insulating material and approximately the same size as said drum end, said plate being secured to said drum end to close said bores and retain said cartridges therein, a cup-shaped casing adjacent one end of said drum end and projecting axially outwardly therefrom with the open end of said casing facing toward said drum, an electrical controller operable in response to variations in said signal to vary the energization of said heaters and maintain said surface at a preselected temperature, said controller being mounted in said casing and spaced therein from said open end, a second plate composed of insulating material and spaced axially outwardly from said first plate to form a heat barrier for insulating said controller from said drum, and means for securing said casing to said drum.

3. A device as defined in claim 2 in which said plates are discs seated against the bottoms of two coaxial counterbores in said drum end.

4. A device as defined in claim 3 in which the rim of said casing is fitted inside the outer one of said counterbores and pressed against said second plate with the rim space radially inwardly from the wall of said one counterbore.

5. A device as defined in claim 4 in which said securing means include a first fastener extending between said casing and said second plate and securing the same together, and a second fastener spaced from said first fastener and extending between said second plate and said drum and securing the same together thereby to avoid the formation of a path for the conduction of heat to said controller through said securing means.

6. A device as defined in claim 2 in which said controller includes a circuit board sized to fit closely within said casing and suported in said casing approximately midway between the ends of said cover with components of the controller mounted on the outer side of the board.

7. A device as defined in claim 6 in which said controller includes at least one hot-running component mounted in heat-conducting contact with the closed end of said casing and spaced from said board.

8. A device as defined in claim 6 further including a set of angularly spaced plug connectors and a set of angularly spaced socket connectors, one set of connectors being mounted on the outer side of said second plate and connected to said heaters and said sensing element, and the other set of connectors being connected to said controller and mounted on the inner side of said circuit board in engagement with the connectors of said one set.

9. A device as defined in claim 6 in which said controller includes at least one voltage dropping resistor embedded in said drum to isolate said resistor from the remainder to the controller as well as to utilize the heat produced by the resistor to assist in heating the drum.

10. A device as defined in claim 9 in which said resistor is fitted in a longitudinal bore in said drum opening through said one end, and is retained in its bore by said first plate.

11. A temperature controlling device including, in combination, a drum adapted to be supported for rotation about a predetermined axis and having an annular peripheral surface for engaging the material to be heated, an electrical resistance heater embedded in said drum below said surface to heat the latter, a temperature sensing element embedded in said drum below said surface and operable to produce a signal varying in accordance with variations in the temperature of said surface, a cup-shaped casing secured to one end of said drum and projecting axially outwardly therefrom with the open end of said casing adjacent said drum end, an electrical controller mounted in said casing for rotation with said drum and operable in response to variations in said signal to vary the energization of said heater and maintain said surface at a predetermined temperature, and a temperature selector for varying said predetermined temperature mounted in said casing adjacent the closed end thereof, said closed end being formed with an opening for access to said selector whereby said selector is accessible through said casing for adjustment of said predetermined temperature.

12. A temperature controlling device including, in combination, a drum adapted to be supported for rotation about a predetermined axis and having an annular peripheral surface for engaging the material to be heated, an electrical resistance heater embedded in said drum below said surface to heat the later, a temperature sensing element embedded in said drum below said surface and operable to produce an electrical signal varying in accordance with variations in the temperature of said surface, a cup-shaped casing disposed against one end of said drum and projecting axially outwardly therefrom with the open end of said casing adjacent said drum end, means releasably securing said casing to said drum end, an electrical controller mounted in said casing for rotation with said drum, and means connecting said controller to said heater and said sensing element whereby the controller is operable in response to variations in said signal to vary the energization of the heater and maintain said surface at a preselected temperature, said connecting means including alined sets of angularly spaced plug and socket connectors mounted on said drum end and in said casing adjacent said open end in position to become engaged as an incident to the placement of said casing against the drum end.

13. A temperature controlling device including, in combination, a drum adapted to be supported for rotation about a predetermined axis and having an annular peripheral surface for engaging the material to be heated, an electrical resistance heater mounted on said drum in contact with the latter to heat said surface, a temperature sensing element mounted on said drum in contact therewith and operable to produce an electrical signal varying in accordance with variations in the temperature of said surface, an electrically operated controller responsive to variations in said signal to vary the energization of said heater in proportion to variations in said signal and thereby maintain said surface at a preselected temperature, and a casing fast on one end of said drum and projecting axially outwardly therefrom, said controller being mounted in said casing and spaced from said drum and said heater to minimize the heating of the controller during heating of the drum.

14. A device as defined in claim 13 further including insulating means forming a heat barrier interposed in said casing between said drum and said controller.

15. A temperature controlling device including, in combination, a heating member, means for supporting said member for rotation about a predetermined axis, said member having an outside peripheral surface engageable with material to be heated during such rotation, variably energizable heating means mounted on and contacting said member to heat said surface, temperature sensing means producing an electrical signal varying in accordance with variations in the temperature of said surface, said sensing means being mounted on said member for rotation therewith adjacent said surface, electrically operated control means for varying the energizing of said heating means in accordance with variations in said signal and thereby maintaining said surface at a preselected temperature, and means supporting said control means for rotation with said member and said sensing means in a position spaced from the heated portion of the member to minimize heating of said control means during operation of the device.

16. A temperature controlling device as defined in claim 15 further including means thermally insulating said control means from said heating means and said heated portion.

References Cited by the Examiner

UNITED STATES PATENTS

| 2,222,817 | 11/1940 | Kline et al. | 34—48 |
| 2,967,924 | 1/1961 | Friend | 219—501 |
| 3,007,023 | 10/1961 | Johnston et al. | 219—210 |
| 3,028,473 | 3/1962 | Dyer et al. | 219—501 |
| 3,041,548 | 6/1962 | Keen et al. | 219—210 |
| 3,109,910 | 11/1963 | Fogleman | 219—501 |
| 3,158,821 | 11/1964 | Sulzer | 219—501 |
| 3,166,667 | 1/1965 | Norton | 219—469 |

FOREIGN PATENTS 992,436    5/1965    Great Britain.

RICHARD M. WOOD, *Primary Examiner.*

L. H. BENDER, *Assistant Examiner.*